United States Patent
Bitzer et al.

(10) Patent No.: US 6,675,078 B2
(45) Date of Patent: Jan. 6, 2004

(54) METHOD AND ARRANGEMENT FOR CONTROLLING A VEHICLE

(75) Inventors: Rainer Bitzer, Weissach (DE); Volker Pitzal, Waldstetten/Wissgoldingen (DE); Martin-Peter Bolz, Buehl (DE); Rolf Maier-Landgrebe, Kernen (DE); Marko Poljansek, Reutlingen (DE); Torsten Heidrich, Vaihingen/Enz (DE); Holger Huelser, Stuttgart (DE); Rainer Mayer, Weil der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/961,071

(22) Filed: Sep. 24, 2001

(65) Prior Publication Data

US 2002/0042323 A1 Apr. 11, 2002

(30) Foreign Application Priority Data

Sep. 22, 2000 (DE) .......................... 100 46 986

(51) Int. Cl.⁷ .............................................. G06F 17/00
(52) U.S. Cl. .............................. 701/22; 701/1; 180/65.1
(58) Field of Search ................................. 701/22, 36, 1; 180/65.1, 65.8

(56) References Cited

U.S. PATENT DOCUMENTS

| | | | | |
|---|---|---|---|---|
| 5,571,058 A | * | 11/1996 | Schmidt | 475/28 |
| 5,991,669 A | | 11/1999 | Dominke et al. | |
| 6,038,500 A | * | 3/2000 | Weiss | 180/410 |
| 6,367,570 B1 | * | 4/2002 | Long, III et al. | 180/65.2 |
| 6,370,451 B2 | * | 4/2002 | Lutz | 701/22 |

* cited by examiner

Primary Examiner—William A Cuchlinski, Jr.
Assistant Examiner—Olga Hernandez
(74) Attorney, Agent, or Firm—Walter Ottesen

(57) ABSTRACT

The invention is directed to a method and an arrangement for controlling a motor vehicle having an integrated electric machine which generates electric as well as mechanical power. In the context of a hierarchal control structure having several logic components, the electric machine is allocated as a component "electric drive" to the component "drive" with respect to its function for generating mechanical power and as a component "generator" to the component "vehicle electric drive" with respect to its function for generating electric power.

5 Claims, 2 Drawing Sheets

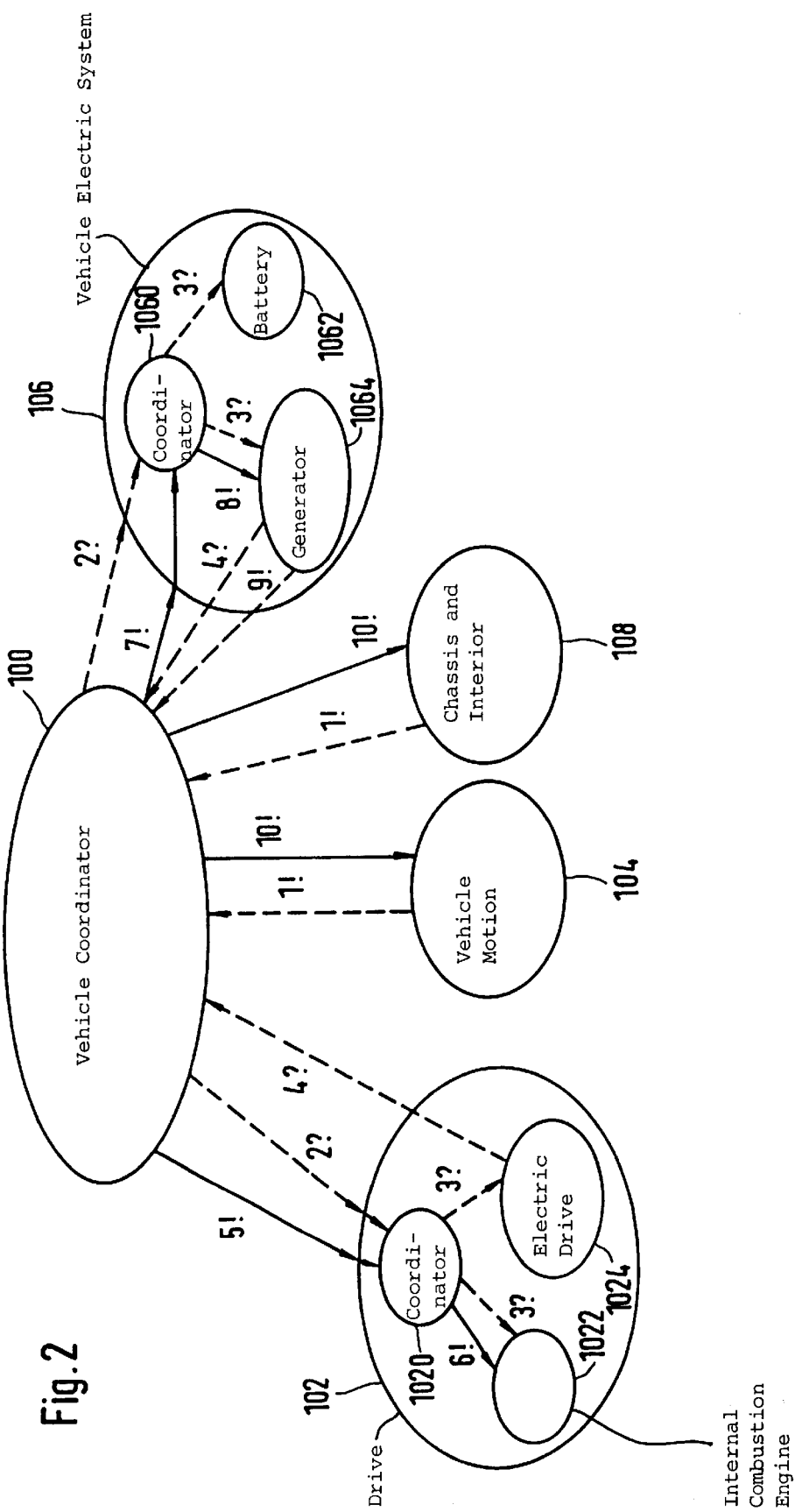

METHOD AND ARRANGEMENT FOR CONTROLLING A VEHICLE

FIELD OF THE INVENTION

The invention relates to a method and an arrangement for controlling a vehicle such as disclosed in U.S. Pat. No. 5,991,669.

BACKGROUND OF THE INVENTION

The control structure described in U.S. Pat. No. 5,991,669 partitions the control system for a vehicle into different components, for example, into a component "source of mechanical power", a component "source of electric power", a component "vehicle motion" and a component "chassis and interior". The two last-mentioned components are exclusively consumers of mechanical and electric power and the two first-mentioned components are consumers as well as generators of mechanical and electric power. Each component is coordinated by a coordinator. Each component is subdivided into subsystems of which, in turn, each individual subsystem is further detailed until the entire vehicle control is subdivided in the context of such a hierarchy or layer structure. The above-mentioned components are coordinated by a coordinator "total vehicle" which, in accordance with predetermined strategies, determines the resources of mechanical and electric power which are available and allocates the same to the individual consumers. Fixed required communication relationships, requests, information inquiries and commands exist between the above-mentioned components with the aid of which the entire vehicle control is undertaken.

In the near future, the marketability of vehicles having integrated electric machines or combined drives (for example, drives having an internal combustion engine and an electric motor for drive purposes) can be expected. Such vehicles are, for example, vehicles having a so-called starter generator, serial hybrid vehicles (wherein an electric motor is driven via a generator by an internal combustion engine), parallel hybrid vehicles (wherein internal combustion engines as well as electric motors can drive the vehicle), conventional vehicles having separate starters and generators, pure electric vehicles and also other types of electric energy generation in vehicles (for example, a vehicle having fuel cells). Such vehicles with integrated electric machines are not considered in the known structuring of vehicle control.

SUMMARY OF THE INVENTION

All of the above-mentioned vehicle variations having integrated electric machines are covered by tying in electric machines, which are integrated in vehicles, into a control structure in accordance with initially-mentioned state of the art.

By logically subdividing the electric machine into two components, a complete symmetry in the handling of the mechanical and electric power is achieved and, in this way, the complexity of such a vehicle is reduced.

Furthermore, the ease of overview of control structures is increased because each of the two components is the source of only one type of power.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
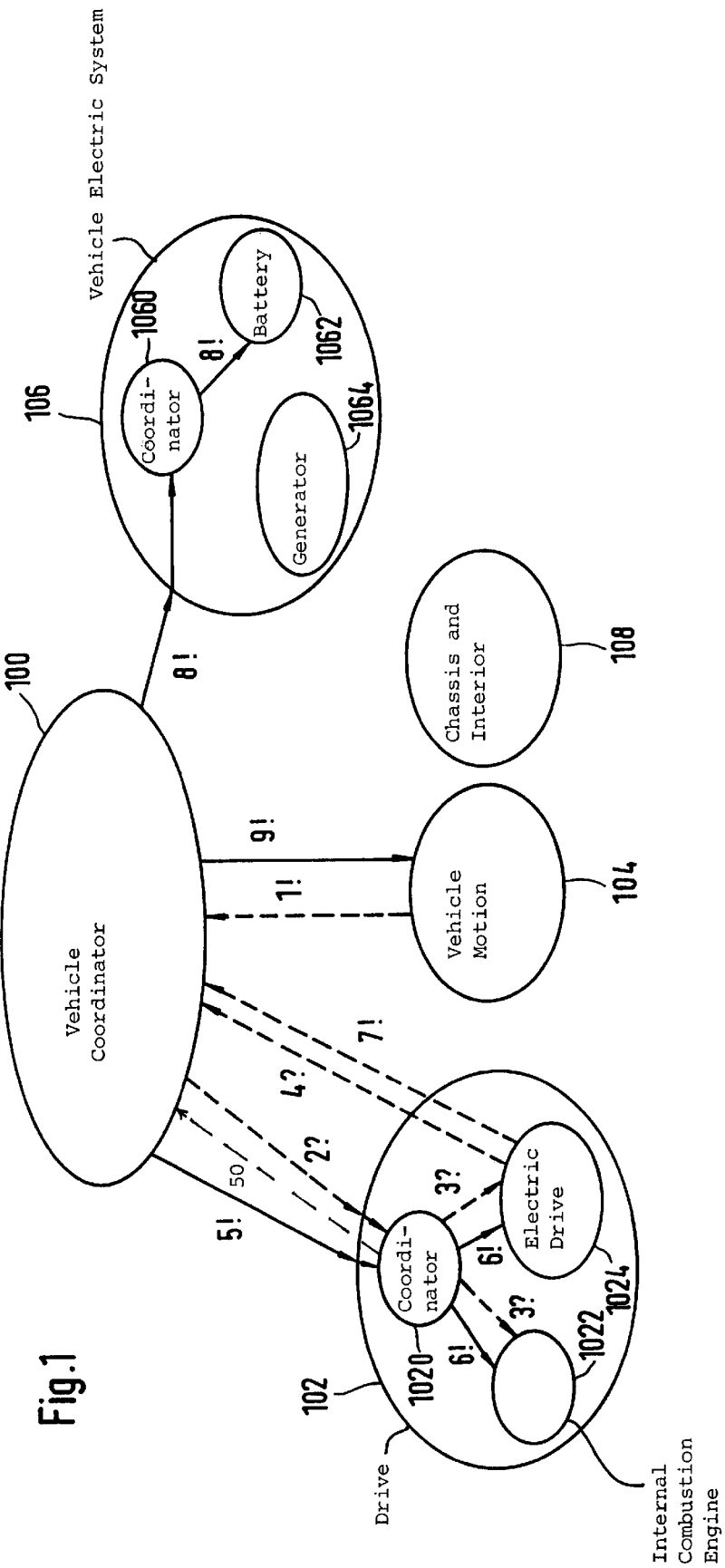
FIG. 1 shows a sequence diagram for the hybrid operation of a vehicle having an integrated electric motor with respect to a mechanical power request for vehicle motion in the context of a control structure showing vehicles having integrated electric machines; and, FIG. 2 is a sequence diagram which shows the generator operation of the electric machine and therefore an electric power demand.

The basic idea of embedding electric machines into the known control structure is the logical subdivision of the electric machine into two components; namely, into the component "electric drive" as a subcomponent of the component "drive" and as a component "mechanical generator" as a subcomponent of the vehicle electric system. With this subdivision, all of the above-mentioned variations are considered. With respect to the system analysis, a starter generator is therefore logically equivalent to an arrangement wherein starter and generator are independent of each other. The dependencies with respect to the control are then considered by the vehicle coordinator in its commands to the component "drive" and the component "vehicle electric system". For example, the vehicle coordinator considers that a starter generator can either only generate current or consume current, that is, the starter generator can be a source of electric power or a source of mechanical power. The subdivision includes also arrangements having a separate starter and generator and drive concepts which have an electric motor, which is driven by the internal combustion engine via a generator. Likewise, the pure electric drive is covered by batteries and fuel cells because here too the electric motor is viewed either as a drive or as a part of the vehicle electric system. When implementing in software, the same software code is utilized for both components without a duplication of the code being necessary.

Here, it is to be noted that, "component" is understood to be only a logic element which, in a few cases (but not in the case of the electric machine), is coincident with the mechanical structure. In the case of the electric machine, the one mechanical structure is subdivided into two logic components which are assigned to detailing levels of two different higher-ranking components.

FIG. 1 shows the control structure with vehicle coordinator and various components. A mechanical power request of the vehicle motion at a battery is shown as a sequence diagram. The battery has sufficient energy for the hybrid drive.

In FIG. 1, first the following components are shown: vehicle coordinator 100, drive 102, vehicle motion 104, vehicle electric system 106 and chassis and interior 108. The components "drive" and "vehicle electric system" are then shown refined in a further detailing level. The component 102 thus includes, in the next detailing level, a coordinator 1020, an internal combustion engine 1022 as well as the electric drive 1024. The component "vehicle electric system" 106 includes a coordinator 1060, the battery 1062 as well as the generator 1064. In the context of the illustration of FIG. 1 and the subsequent description of FIG. 2, it is understood that "component" does not mean the mechanical component but rather logic elements whose logic function is developed or shaped by control software.

First, a request for mechanical power is made by the component "vehicle motion" 104 to the coordinator of the entire vehicle 100 (see relationship 1!). In one embodiment, the component forms this request in accordance with a driver command or an input value of another system (for example, a road speed controller). Depending upon the embodiment, the request value is a torque value or power value needed for the propulsion. The rpm of the torque transmitter is known to the vehicle coordinator for a torque request. Thereafter, the coordinator "total vehicle" 100 inquires via the communication relationship 2? as to the mechanical power potential of the drive at the component "drive" 102. The coordinator "total vehicle" needs this information in order to estimate whether the request and, if required, other requests, can be satisfied. In the component "drive", this request is directed to the coordinator 1020. In the next step, the coordinator 1020 inquires via the communication relationship 3? as to the mechanical power potential of the electric drive 1024 and of the internal combustion engine 1022. These values are determined by the respective components on the basis of the actual and maximum possible operating variables. The component "electric drive" 1024 inquires via the communication relationship 4? from the vehicle coordinator 100 as to the available electric power potential which is made available for the motor operation. A boundary condition is here that no electric power generation takes place via the generator because, otherwise, no driving torque can be generated. The coordinator "total vehicle" answers this inquiry by transmitting a corresponding inquiry to the component "electric vehicle system" while evaluating the answer. The coordinator 1020 combines the individual answers from the components 1024 and 1022 with respect to the mechanical power potential (for example, by addition) and transmits this combined answer to the vehicle coordinator 100 via communication relationship 50. The vehicle coordinator 100 then issues the command to the component "drive" via the command relationship 5! to make available the wanted mechanical power. This is the case when the power potential is sufficient for making available the wanted value. Otherwise, the command is correspondingly limited. The command 5! is transmitted to the coordinator 1020 which transmits the power request via the command relationship 6! to the components "internal combustion engine" 1022 and/or "electric drive" 1024. The coordinator of the drive 1020 decides therefore as to the hybrid drive. The coordinator makes this decision in accordance with the strategy implemented therein, for example, basically to drive with the electric drive as long as the wanted mechanical power can be made available under the boundary conditions of the electric vehicle system. When the command goes to the component "electric drive", then the latter acquires the making available of the corresponding electric power for the electric drive via the request relationship 7! via the coordinator 100. The coordinator 100 converts this request in to the command 8! which the coordinator sends to the component "electric vehicle system". This command is there transmitted to the coordinator 1060 which ensures making available the wanted electric power via the battery 1062 via the command relationship 8!. Furthermore, the coordinator 100 issues the command to consume the mechanical power made available by control of the propulsion via the command relationship 9! to the component "vehicle motion" 104.

In FIG. 2, a communications diagram is shown in the control structure of FIG. 1 which applies for the generator operation when, for example, an additional electric power request is made. In this case, the battery must be charged by the generator 1064. The generation of mechanical power by the electric machine is then not possible.

The starting point can be a request of the component "vehicle motion" 104 to the vehicle coordinator 100 for mechanical power and by the component "chassis and interior" 108 for electric power (request relationship 1!). As shown in FIG. 1, the coordinator 100 inquires with respect to the mechanical power as to the mechanical power potential of component 102 via the inquiry relationship 2?; whereas, the coordinator 100 asks via the inquiry relationship 2? with respect to the requested electric power from the component "vehicle electric system" 106 as to its electric power potential. The inquiry 2? is transmitted to the coordinator 1060 in the component "vehicle electric system" 106. The coordinator 1060 of the component "vehicle electric system" 106 inquires via the inquiry relationship 3? as the electric power potential from battery 1062 and generator 1064. This value too is determined on the basis of actual operating variables.

Corresponding to FIG. 1, the coordinator 1020 of the component 102 inquires as to the mechanic power potential of the components 1022 and 1024. The generator 1064 then asks via the inquiry relationship 4? the mechanical power potential for the generator from the coordinator 100. While considering the answers to these inquiries, the coordinator 100 issues via the command relationship 5! the command to make available the requested mechanical power to the component "drive" and there to the coordinator 1020. As shown above, this command is transmitted to the internal combustion engine in the context of the command relationship 6!.

Parallel to the above, the electric power potential which is available for the drive is inquired by the component "electric drive" 1024 from the coordinator 100 via the inquiry relationship 4?. The electric power potential is zero because the component 106 generates electric energy. This return announcement is evaluated by the coordinator 1020 for controlling the hybrid drive. Since a request is present for electric power, a command to the electric drive 1024 is not issued because, as mentioned above, the starter generator always either generates current or consumes current. In the embodiment shown in FIG. 2, the current generation is primary. For this reason, the starter generator cannot be used as electric drive. The command relationship 6! therefore is directed only to the component "internal combustion engine" 1022.

The coordinator 100 then commands via the command relationship 7! the component "electric vehicle system" 106 with the making available of the requested electric power in the context of its power potential. This command is transmitted to the coordinator 1060. This coordinator 1060 transmits the command in the context of the command relationship 8! to the generator 1064. The generator 1064 requests the mechanical power, which is necessary for generating the electric power from the coordinator 100 via the request relationship 9!. The coordinator 100 modifies the command for making available the mechanical power in correspondence to the power potential of the component 102. Via the command relationship 10!, the coordinator 100 then orders the components "vehicle motion" 104 and the "chassis and interior" 108 with the consumption of the requested mechanical and electric power.

It is understood that the foregoing description is that of the preferred embodiments of the invention and that various changes and modifications may be made thereto without departing from the spirit and scope of the invention as defined in the appended claims.

What is claimed is:

1. A method for controlling a vehicle having an integrated electric starter which generates electric power and mechanical power and wherein several logic components are present and arranged in the context of a hierarchy and wherein the logic components communicate with each other via pregiven communications connections, the method comprising the steps of:

subdividing at least a portion of said logic components into additional components with said logic components including the logic components "drive" and "vehicle electric system";

allocating said electric starter to said logic component "drive" as a component "electric drive" with respect to the function of said electric starter of generating mechanical power so as to cause said electric starter to assume the function of a consumer during a first time of operation; and, allocating said electric starter to said logic component "vehicle electric system" as a component "generator" with respect to the function of said electric starter of generating electric power so as to cause said electric starter to assume the function of a resource during a second time.

2. The method of claim 1, wherein said electric starter is a starter generator and/or an electric drive.

3. The method of claim 1, wherein, during operation of said electric starter as drive, the coordinator of the component "drive" decides as to the distribution of the requested power to the internal combustion engine and the electric drive in accordance with a pregiven strategy.

4. The method of claim 1, wherein a first control code is used for the component "electric drive" and a second control code is used for the component "generator"; and, said first and second control codes are the same.

5. An arrangement for controlling a vehicle having an integrated electric starter which generates electric power and mechanical power and wherein several logic components are present and arranged in the context of a hierarchy and wherein the logic components are subdivided into additional components, the arrangement comprising:

said logic components including the logic components "drive" and "vehicle electric system";

means for allocating said electric starter to said logic component "drive" as a component "electric drive" with respect to the function of said electric starter of generating mechanical power so as to cause said electric starter to assume the function of a consumer during a first time of operation; and, means for allocating said electric starter to said logic component "vehicle electric system" as a component "generator" with respect to the function of said electric starter of generating electric power so as to cause said electric starter to assume the function of a resource during a second time.

\* \* \* \* \*